Jan. 20, 1970  A. P. TURLE  3,490,167
FISHING WEIGHTS

Filed Feb. 2, 1968

INVENTOR
ARTHUR PERCY TURLE
BY
*Linton and Linton*
ATTORNEYS

Jan. 20, 1970   A. P. TURLE   3,490,167
FISHING WEIGHTS

Filed Feb. 2, 1968   2 Sheets-Sheet 2

INVENTOR
ARTHUR PERCY TURLE
BY
Linton and Linton
ATTORNEYS

United States Patent Office 3,490,167
Patented Jan. 20, 1970

3,490,167
FISHING WEIGHTS
Arthur P. Turle, 14 East St., Ashburton,
Devon, England
Filed Feb. 2, 1968, Ser. No. 702,661
Claims priority, application Great Britain, Mar. 3, 1967,
10,171/67
Int. Cl. A01k 95/00
U.S. Cl. 43—44.97                                    4 Claims

ABSTRACT OF THE DISCLOSURE

A ledgering weight which is oviform in plan view and tapers in thickness from a maximum at the narrow end of the oviform, reducing in thickness towards the broad end. A loop, for the attachment of a swivel clip, is provided at the narrow end and has a straight portion extending over the whole width of the weight.

---

This invention relates to fishing weights, particularly but not exclusively, to fishing weights of the type known as ledgering weights.

Ledgering weights are used on fishing tackle for ensuring that the baited tackle sinks down into the water, to assist in casting the tackle, and to maintain the tackle in a position to which it has been cast.

A variety of designs of fishing weights have been proposed which provide enhanced grip on the sea or river bed when they have been cast out, to retain the fishing tackle weighted thereby against being carried away by the action of tides or currents. However, the grip provided by such weight has been limited, and the designs adopted to achieve grip have detracted from the qualities of the weight for casting purposes, particularly in the provision of protrusions on the weight which can become tangled with the tackle during casting. Further to achieve sufficient grip, it has been necessary to use weights of a greater mass than is desirable, with resulting difficulties in casting.

A further problem is that when it is desired to wind in a fishing tackle weighted by ledger weights of many present designs, the weight tends to drag along the bed and consequently either gets caught on obstructions, or collects loose material, such as weed, lying on the bed.

It is an object of the present invention therefore to provide a ledgering weight with enhanced grip qualities while not increasing the mass of the weight, and a further object to provide a ledgering weight which is so shaped as to be convenient for casting and to kite or plane upwardly clear of the bed as it is wound in with a tackle to which it is attached.

Accordingly the present invention provides a fishing weight which is substantially oviform in plan view and which is tapered in thickness from a maximum thickness at the narrow end of said oviform reducing in thickness towards the broad end of said oviform, and means for attaching said weight to a fishing tackle provided at said narrow end.

According to a further aspect of the invention there is provided such a fishing weight wherein the center of gravity of said weight is nearer said narrow end than said broad end.

In order to promote a fuller understanding of the invention one embodiment will now be described, by way of example only, with reference to the accompanying drawings in which:

FIGURE 7 shows an elevation of the weight being wound in.

Figure 1:
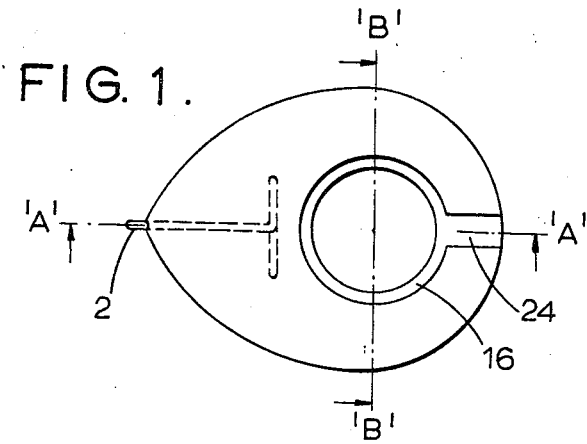
FIGURE 1 shows a plan view of the embodiment.
Figure 2:
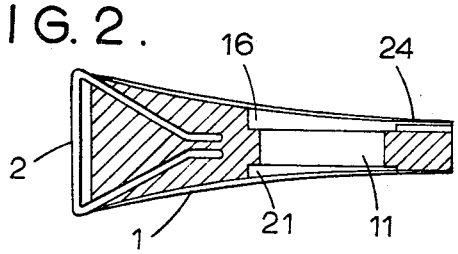
FIGURE 2 shows a longitudinal-section taken on the line A—A of FIGURE 1.

The fishing weight 1 shown in FIGURE 1 is in plan view and shown generally oviform. The weight 1 is made as a casting of lead or other heavy metal in a conventional manner and is provided with a wire loop 2 so that the weight may be attached to fishing tackle for use therewith. The loop 2 is formed of brass or other metal wire and is cast into the weight as shown in FIGURES 1 and 2 with ends being bent outwardly as shown to retain it firmly. In order to attach the weight to fishing tackle, a conventional swivel clip is attached to loop 2 in conventional manner as shown for instance at 4 in FIGURE 6.

FIGURE 2 shows a longitudinal cross-section of the weight 1 taken on the line A—A of FIGURE 1, and from this it can be seen that the weight tapers from a maximum height at the narrow end (at the left in the figure) of the oviform plan view, down in height towards the broad end of the oviform. Further, in this embodiment the top and bottom surfaces, as seen in FIGURE 2, are concave in the longitudinal direction.

Figure 3:
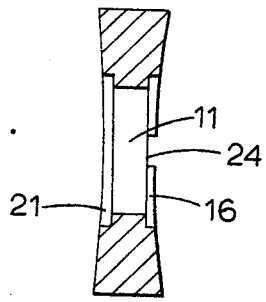
FIGURE 3 shows a cross-section taken on the line B—B of FIGURE 1.

FIGURE 3 shows a cross-section taken on line B—B of FIGURE 1, and shows the top and bottom surfaces of this embodiment also to be slightly concave in the crosswise direction.

Figure 6:
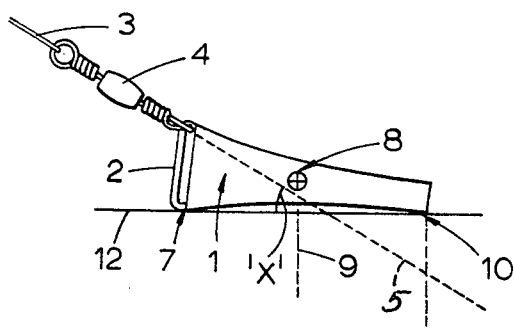
FIGURE 6 shows an elevation of the weight lying on the bed.

FIGURE 6 shows the weight of this embodiment lying on the sea bed and connected to a fishing tackle line 3 by means of the swivel clip 4. It can be seen that the direction of pull exerted on the weight 1 by the line 3 lies along the path shown dotted at 5 when the line 3 is under tension. This direction of pull makes an angle X with the horizontal which also, in FIGURE 6, corresponds with the bed 12. It will be noted also that when the line 3 is under tension the tendency is for the swivel clip 4 to ride up to the top of the loop 2 which has a straight portion extending over the whole height of the narrow end of the oviform weight.

The weight 1 resists the horizontal component of the tension in the line 3 to retain itself in position on the bed by the action of the lower corner 7 of the narrow end of the weight tending to dig into the surface of the bed.

The center of gravity of the weight 1 is indicated at 8 and the line of action of the mass of the weight 1 is shown by the dotted line 9.

For a given tension on the line 3, for instance equal to the mass of the weight 1, as the angle X is increased, the tendency is for the weight to lift, pivoting about the lower corner 10 of the broad end of the weight 1. As soon as the weight 1 lifts about the corner 10 it can be seen that the corner 7 will no longer grip on the sea bed and resistance to the horizontal component of the tension in the line 3 is lost. By comparing the moment of the mass of the weight 1 acting along the line 9, about the corner 10 and the moment of the tension in the line 3 acting along the line 5, about the corner 10 it can be seen that the angle X can reach a considerable value, approaching in fact 80° before the corner 7 lifts clear of a horizontal bed.

Alternatively, as the angle X decreases, by comparing the moment of the mass of the weight 1 about the corner 7 with the moment of the tension in the line 3 about the corner 7, it can be seen that the tension in the line 3 will not cause the weight 1 to topple about the corner 7 on a horizontal bed unless the tension in the line 3 exceeds by a considerable margin the mass of the weight 1.

Thus it can be seen that by making the weight in the general configuration exemplified by this embodiment with the center of gravity maintained towards the narrow end of the oviform of the weight, the gripping qualities of the weight are enchanced over a wide range of tension angles in the line by which it is connected to a fishing tackle.

Figure 7:
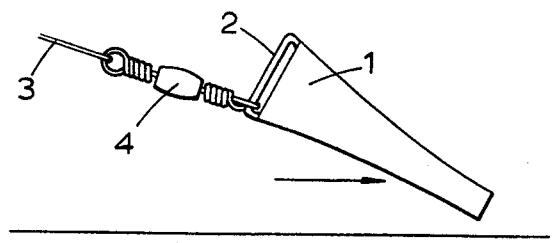

When it is desired to wind the weight in, and the tackle is pulled either so that the weight lifts about the corner 10, or topples about the corner 7 to destroy the grip of the weight and to allow the tackle to be wound in rapidly, then due to its shape, the fishing weight adopts a kiting or planing position in the water as shown in FIGURE 7. The swivel clip 4 slides down towards the bottom of the loop 2 allowing the weight 1 to assume an optimum angle and the weight planes on its lower surface creating sufficient lift to carry it clear of the bed 12 as it is wound in.

It can be seen that the top and bottom surfaces of the weight may if desired be straight while tapering generally in the manner shown in the drawing, without departing from the essential features of the invention. However if the top and bottom surfaces are made concave as shown, it does enhance the grip of the weight on the sea bed and also its kiting qualities.

In order to carry rubby dubby (that is to say, minced fish and other ingredients attractive to fish) in the weight, a hole 11 may be provided towards the broad end of the oviform. This hole may be filled with solid rubby dubby discs which dissolve slowly in the water, or alternatively, may be filled with a felt pad saturated in, for instance, pilchard oil.

Figure 4:
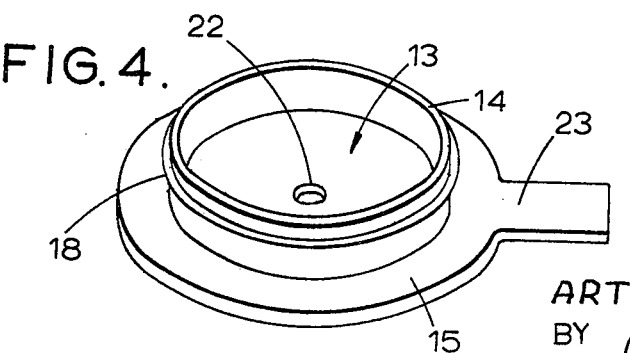
FIGURE 4 shows a container for rubby dubby for fitment to the weight of FIGURE 1.
Figure 5:
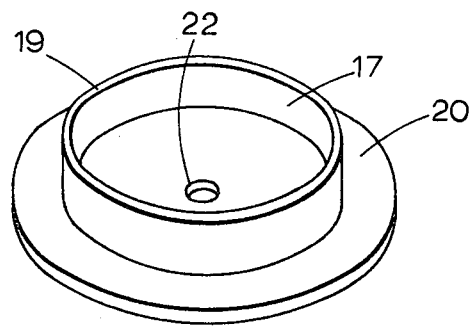
FIGURE 5 shows a cap for the container of FIGURE 4.

Alternatively, the rubby dubby container 13 shown in FIGURE 4 may be filled with rubby dubby and then be inserted in the hole 11 in the weight 1. The body 14 of the container 13 provides a clearance fit in the hole 11 and the flange 15 seats in the recess 16 provided in the weight around the hole 11. To retain the rubby dubby, a cap 17, as shown in FIGURE 5, is fitted over the body 14 of the container and is made a tight fit thereon by a ridge 18 provided around the body 14. The body 19 of the cap is a loose push fit in the hole 11 and the flange 20 of the cap seats in the recess 21 provided in the weight around the hole 11.

Thus it can be seen that the container 13 is retained in the hole 11 and closed by the cap 17. In order to allow the rubby dubby to escape slowly, two holes 22 are provided, one in the container 13 and one in the cap 17. Lastly, a tab 23 is attached to the flange 15 of the container to assist in removal of the container from the weight, and a recess 24 is provided in the weight in which the tab 23 may lie when the container is in position.

Thus it can be seen that the invention provides a ledgering weight of enhanced gripping qualities while allowing it to kite or plane clear of the sea bed during retrieval, and at the same time provides a weight of a suitable shape for casting which is substantially free of the protrusions which are provided on weights of some previous designs to enhance grip, but which increase the chances of the weight becoming intangled in the tackle during casting.

We claim:
1. A ledgering weight comprising a body which is substantially oviform in plan view so as to have a broad end and a narrow end, the weight tapering in thickness from a maximum at the narrow end and reducing in thickness towards the broad end, and a loop for the attachment of a fishing tackle, said loop being secured to the body at said narrow end and having a straight portion extending over substantially the whole thickness of the narrow end of the body.

2. A ledgering weight as claimed in claim 1, the center of gravity of the weight being nearer the narrow end than the broad end of the body.

3. A ledgering weight as claimed in claim 2, further including a swivel clip attached to the loop, said clip being capable of pivoting about the loop and of sliding the whole length of the straight portion.

4. A ledgering weight as claimed in claim 2, said body having a hole nearer said broad end, a fish-attractive ingredients container having a removable cap fitted within said hole, said cap having an outlet for fish-attractive ingredients.

References Cited
UNITED STATES PATENTS

| | | | |
|---|---|---|---|
| 2,033,683 | 3/1936 | Clark | 43—44.96 |
| 2,481,707 | 9/1949 | Young | 43—43.13 |
| 2,577,549 | 12/1951 | Vice | 43—44.97 |
| 2,644,266 | 7/1953 | Updegrove | 43—44.96 |
| 2,842,889 | 7/1958 | Ganger | 43—44.99 |
| 2,906,055 | 9/1959 | Pizzani | 43—44.99 |
| 2,968,114 | 1/1961 | Spierer | 43—44.99 |

SAMUEL KOREN, Primary Examiner

DANIEL J. LEACH, Assistant Examiner

U.S. Cl. X.R.

43—44.99